US012748430B2

(12) United States Patent
Kugou et al.

(10) Patent No.: US 12,748,430 B2
(45) Date of Patent: Sep. 29, 2026

(54) AUTONOMOUS ROBOT SYSTEM, AND METHOD FOR CONTROLLING AUTONOMOUS ROBOT

(71) Applicant: Panasonic Intellectual Property Management Co., Ltd., Osaka (JP)

(72) Inventors: Noriyuki Kugou, Kanagawa (JP); Sonoko Hirasawa, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 343 days.

(21) Appl. No.: 18/567,233

(22) PCT Filed: May 24, 2022

(86) PCT No.: PCT/JP2022/021264
§ 371 (c)(1),
(2) Date: Dec. 5, 2023

(87) PCT Pub. No.: WO2022/259863
PCT Pub. Date: Dec. 15, 2022

(65) Prior Publication Data

US 2024/0264604 A1 Aug. 8, 2024

(30) Foreign Application Priority Data

Jun. 8, 2021 (JP) ................................ 2021-096042

(51) Int. Cl.
*G05D 1/225* (2024.01)
*B65G 1/137* (2006.01)
(Continued)

(52) U.S. Cl.
CPC ............. *G05D 1/225* (2024.01); *B65G 1/137* (2013.01); *G05D 1/226* (2024.01); *G05D 1/243* (2024.01);
(Continued)

(58) Field of Classification Search
CPC ........ G05D 1/225; G05D 1/226; G05D 1/243; G05D 1/667; G05D 2105/28;
(Continued)

(56) References Cited

U.S. PATENT DOCUMENTS 10,556,339 B2 2/2020 Fujimoto et al.
11,279,031 B2 3/2022 Fujimoto et al.
(Continued)

FOREIGN PATENT DOCUMENTS

CN 105988478 10/2016
CN 111906776 11/2020
(Continued)

OTHER PUBLICATIONS

International Search Report issued in International Pat. Appl. No. PCT/JP2022/021264, dated Aug. 16, 2022.
(Continued)

*Primary Examiner* — Sohana Tanju Khayer
(74) *Attorney, Agent, or Firm* — Greenblum & Bernstein, P.L.C.

(57) ABSTRACT

A system includes a worker robot configured to move in a facility, a robot control server for controlling operations of the worker robot, and a presence management server for managing presence information on a user's presence in an office of the facility. The robot control server acquires, via an SNS system, a work request entered by the user using the SNS; acquires work information about the user's work request; acquires the user's position data as a destination from the presence management server; and controls the operations of the worker robot based on the work information and the user's position data.

6 Claims, 12 Drawing Sheets

(51) Int. Cl.

| | |
|---|---|
| ***G05D 1/226*** | (2024.01) |
| ***G05D 1/243*** | (2024.01) |
| ***G05D 1/667*** | (2024.01) |
| ***G06Q 10/08*** | (2024.01) |
| *G05D 105/28* | (2024.01) |
| *G05D 111/10* | (2024.01) |

(52) U.S. Cl.

CPC ............. *G05D 1/667* (2024.01); *G06Q 10/08* (2013.01); *G05D 2105/28* (2024.01); *G05D 2111/10* (2024.01)

(58) Field of Classification Search

CPC ......... G05D 2111/10; G05D 2105/315; G05D 2105/285; G05D 2107/63; G05D 2109/10; B65G 1/137; G06Q 10/08

See application file for complete search history.

(56) References Cited

U.S. PATENT DOCUMENTS

| | | | | |
|---|---|---|---|---|
| 2016/0012393 | A1 | 1/2016 | Wang et al. | |
| 2016/0089782 | A1* | 3/2016 | Sisbot | B25J 9/163 700/250 |
| 2016/0279793 | A1* | 9/2016 | Sisbot | B25J 9/1674 |
| 2018/0065805 | A1* | 3/2018 | Zevenbergen | G06Q 10/087 |
| 2019/0099681 | A1* | 4/2019 | Rico | B25J 5/007 |
| 2019/0337154 | A1* | 11/2019 | Holson | B25J 9/1697 |
| 2019/0340674 | A1* | 11/2019 | Vaananen | F25D 27/005 |
| 2020/0379482 | A1* | 12/2020 | Park | G05D 1/0287 |
| 2021/0051228 | A1 | 2/2021 | Yoshikawa | |
| 2021/0072750 | A1* | 3/2021 | Lee | B25J 11/008 |
| 2021/0256472 | A1* | 8/2021 | Javidan | H04W 4/025 |
| 2021/0394362 | A1* | 12/2021 | Sodeyama | B25J 9/1612 |
| 2022/0026920 | A1* | 1/2022 | Ebrahimi Afrouzi | G06N 3/0495 |
| 2022/0226996 | A1* | 7/2022 | Ishizuka | B25J 9/1664 |
| 2022/0324646 | A1* | 10/2022 | Sohn | G06Q 30/0601 |
| 2022/0366747 | A1* | 11/2022 | Otsuki | B60W 60/00256 |
| 2023/0367520 | A1* | 11/2023 | Kubota | G06F 3/1286 |
| 2024/0086509 | A1* | 3/2024 | Iwai | G06T 7/00 |

FOREIGN PATENT DOCUMENTS

| | | |
|---|---|---|
| JP | 2003-340762 | 12/2003 |
| JP | 2015-220490 | 12/2015 |
| JP | 2017-209769 | 11/2017 |
| JP | 2018-005653 | 1/2018 |
| WO | 2019/156209 | 8/2019 |

OTHER PUBLICATIONS

Notice of Reasons for Refusal for Japanese Pat. App. No. 2021-096042, dated Nov. 19, 2024, together with an English language translation.

Office Action issued in China Patent Application No. 202280041033.3, dated Jun. 16, 2026, together with English translation thereof.

* cited by examiner

Fig.6

Use for delivery of an item

| Operation instruction information for worker robot | | Operations of robot control server |
|---|---|---|
| operations | detailed information | |
| move (To position of sender user) | position data of sender user | Request presence management server for presence state info (transmit ID of requester user) |
| shoot face (For face authn of sender user) | — | Request face authentication server for face authentication (transmit shot face image and ID of requester user) |
| receive item | — | |
| move (To position of receiver user) | position data of receiver user | Request presence management server for presence state info (transmit ID of receiver user) |
| shoot face (For face authn of receiver user) | — | Request face authentication server for face authentication (transmit shot face image and ID of receiver user) |
| deliver item | — | |

Fig.9

Use for delivery of an order

| Operation instruction information for worker robot | | Operations of robot control server |
|---|---|---|
| operations | detailed information | |
| move<br>(To position of store) | position data of store | acquire position data of store from intra-database |
| recognize item (an order) | feature data of item | acquire feature data of item from intra-database |
| grasp item | feature data of item | |
| move<br>(To position of requester user) | position data of requester user | Request presence management server for presence state info (transmit ID of requester user) |
| deliver an order | — | |

*Fig.11*

Use for leading the way

| Operation instruction information for worker robot | |
|---|---|
| operations | detailed information |
| move<br>(To destination place) | position data of destination place |

AUTONOMOUS ROBOT SYSTEM, AND METHOD FOR CONTROLLING AUTONOMOUS ROBOT

TECHNICAL FIELD

The present disclosure relates to an autonomous robot system and a method for controlling an autonomous robot such that, in response to a work request from a user, the autonomous robot does a work requested by the user.

BACKGROUND ART

In a facility, cases often occur in which an item such as a document needs to be delivered from one person to another; that is, from a sender person to a receiver person. For such cases, a worker robot can replace a human in the task of delivering an item to a receiver person, thereby reducing the burden placed on human workers.

Known technologies in which a worker robot is used for item delivery include a system that enables a sender user to hand off an item to a worker robot and request delivery services, so that the worker robot can deliver the item to a receiver person (Patent Document 1). More specifically, in this system of the prior art, a sender user hands over an item to a sender's worker robot located at the sender user's place. Then, the sender's worker robot moves to a robot standby place where a receiver's worker robot is located, and passes the item onto the receiver's worker robot. Then the receiver's worker robot moves to a place where a receiver person is present and hands off the item to the receiver person.

PRIOR ART DOCUMENT (S)

Patent Document(s)

Patent Document 1: JP2003-340762A

SUMMARY OF THE INVENTION

Task to be Accomplished by the Invention

In the above-described system of the prior art, when a sender user hands over an item to a worker robot, the sender user needs to operate an input device of the robot in order to request a delivery service. As a result, the sender user seated in the user's seat cannot always easily and comfortably make a request for delivery to the robot. Moreover, when the sender's worker robot is not located near the sender user, the sender user needs to go to a robot standby place where a worker robot is located in order to hand over an item to the robot. Thus, the system of the prior art can be uncomfortable for a sender user who uses the system for delivery of an item, and what is desired is a system in which these problems are solved.

However, in order to solve the problems of the prior art, the system needs to be modified to include, in addition to a controller for controlling a worker robot, another dedicated sub-system that allows a user to make a request for item delivery to a worker robot. This results in another problem of difficulty in implementing a system for causing a worker robot to do a requested work without increasing system construction cost.

The present invention was made in view of such a problem of the prior art, and has a primary object to provide an autonomous robot system and a method for controlling an autonomous robot, which enables a system for causing an autonomous robot to do a work requested by a user to be implemented at a low cost, without using an additional dedicated sub-system that allows the user to make a work request to the robot.

Means to Accomplish the Task

An aspect of the present invention provides an autonomous robot system for controlling an autonomous robot such that, in response to a work request from a user, the autonomous robot does a work requested by the user, the system comprising: a stay management server for managing a location where the user stays in a facility; the autonomous robot configured to move in the facility; and a control device for controlling operations of the autonomous robot, wherein the control device is configured to: acquire, via an SNS system, input data of the work request entered by the user when the user uses an SNS; acquire work information about the work requested by the user based on the input data; acquire position data of the user's position as a destination from the stay management server; and control the operations of the autonomous robot based on the work information and the position data of the user's position.

Another aspect of the present invention provides a method for controlling an autonomous robot such that, in response to a work request from a user, the autonomous robot does a work requested by the user, wherein the autonomous robot is configured to move in a facility, and wherein a control device controls operations of the autonomous robot, the method comprising causing the control device to: acquire, via an SNS system, input data of the work request entered by the user when the user uses an SNS; acquire work information about the work requested by the user based on the input data; acquire position data of the user's position as a destination from the stay management server; and control the operations of the autonomous robot based on the work information and the position data of the user's position.

Effect of the Invention

According to the present invention, a system for causing an autonomous robot to do a work requested by a user can be implemented at a low cost, without using an additional dedicated sub-system that allows the user to make a work request to the robot.

BRIEF DESCRIPTION OF THE DRAWINGS

FIG. 6 is an explanatory diagram showing operation instruction information provided to a worker robot when a requested work is delivery of an item;

FIG. 9 is an explanatory diagram showing operation instruction information provided to a worker robot when a requested work is delivery of an ordered item;

FIG. 11 is an explanatory diagram showing operation instruction information provided to a worker robot when a requested work to be done by the worker robot is leading the user to a destination.

DESCRIPTION OF THE PREFERRED EMBODIMENT(S)

Figure 1:
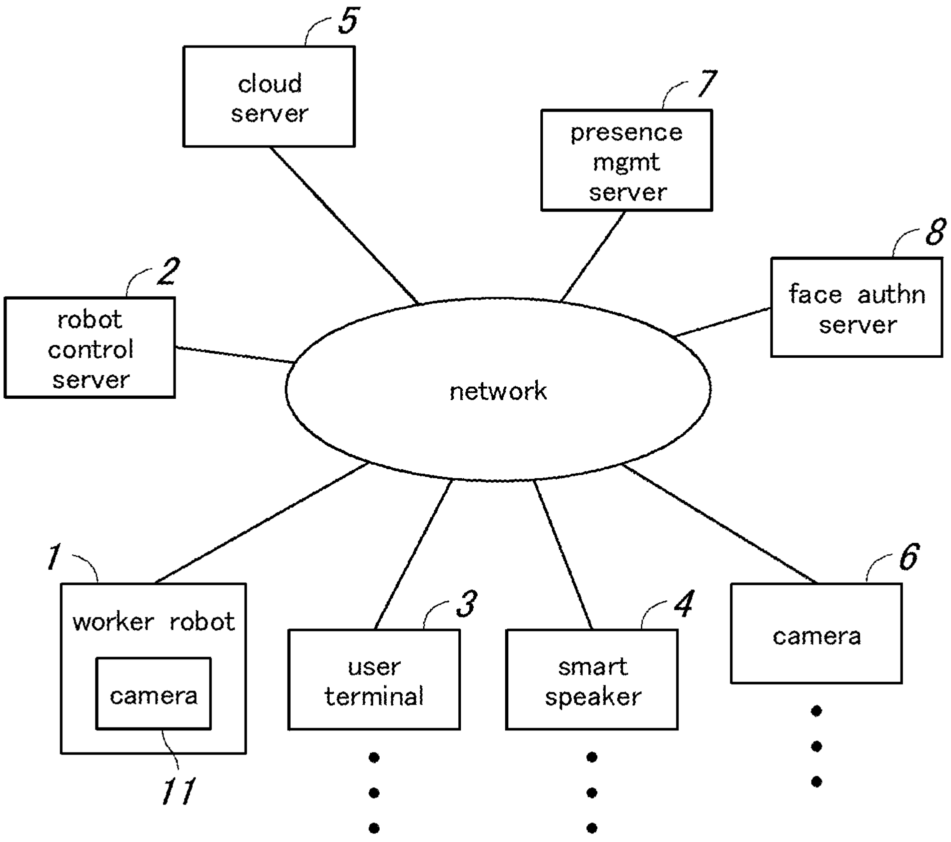
FIG. 1 is a diagram showing an overall configuration of an autonomous robot system according to one embodiment of the present invention.

A first aspect of the present invention made to achieve the above-described object is an autonomous robot system for controlling an autonomous robot such that, in response to a work request from a user, the autonomous robot does a work requested by the user, the system comprising: a stay management server for managing a location where the user stays in a facility; the autonomous robot configured to move in the facility; and a control device for controlling operations of the autonomous robot, wherein the control device is configured to: acquire, via an SNS system, input data of the work request entered by the user when the user uses an SNS; acquire work information about the work requested by the user based on the input data; acquire position data of the user's position as a destination from the stay management server; and control the operations of the autonomous robot based on the work information and the position data of the user's position.

According to this configuration, a system for causing an autonomous robot to do a work requested by a user can be implemented at a low cost, without using an additional dedicated sub-system that allows the user to make a work request to the robot.

The control device may be separate from the autonomous robot and configured as a control device (robot control server) that can communicate with the autonomous robot. In other cases, the control device may be configured as a control device provided within the autonomous robot.

A second aspect of the present invention is the autonomous robot system of the first aspect, further comprising a face authentication server for performing face authentication to verify the user's identity, wherein the autonomous robot is provided with a camera configured to shoot the user's face, and wherein the control device is configured to: provide face image captured by the camera and the user's ID information acquired from the input data of the work request to the face authentication server; cause the face authentication server to perform face authentication; and receive a face authentication result from the face authentication server.

In this configuration, face authentication is performed to verify the user's identity. Thus, for example, in the case of delivery of an item, this configuration can prevent misdelivery of the item; that is, prevent a worker robot from receiving an item from a wrong sender user or delivering an item to a wrong receiver user.

A third aspect of the present invention is the autonomous robot system of the first aspect, wherein, when the work requested by the user, who is a requester user, is delivery of an item to a receiver user who is to receive the item, the control device acquires position data of the user and that of the receiver user, and instructs the autonomous robot to make a movement based on the position data of the requester user and that of the receiver user.

This configuration enables the worker robot to properly do the work of delivery of an item from a sender user to a receiver user.

A fourth aspect of the present invention is the autonomous robot system of the first aspect, wherein, when the work requested by the user, who is a requester user, is delivery of an ordered item to the requester user, the control device acquires position data of the requester user and that of an ordered item providing place where the ordered item is to be picked up, and instructs the autonomous robot to make a movement based on the position data of the requester user and that of the ordered item providing place.

This configuration enables the worker robot to properly do the work of delivery of an ordered item.

A fifth aspect of the present invention is the autonomous robot system of the first aspect, wherein, when the work requested by the user is leading the user to a destination, the control device acquires position data of the destination, and instructs the autonomous robot to make a movement based on the position data of the destination.

This configuration enables the worker robot to properly do the work of leading the user to a destination.

A sixth aspect of the present invention is the autonomous robot system of the first aspect, wherein, when the autonomous robot successfully completes the work requested by the user, who is a requester user, the control device transmits a report of work completion to the requester user via the SNS system.

In this configuration, after making a request to the worker robot, the user can easily confirm that the requested work has been successfully completed.

A seventh aspect of the present invention is a method for controlling an autonomous robot such that, in response to a work request from a user, the autonomous robot does a work requested by the user, wherein the autonomous robot is configured to move in a facility, and wherein a control device controls operations of the autonomous robot, the method comprising causing the control device to: acquire, via an SNS system, input data of the work request entered by the user when the user uses an SNS; acquire work information about the work requested by the user based on the input data; acquire position data of the user's position as a destination from the stay management server; and control the operations of the autonomous robot based on the work information and the position data of the user's position.

According to this configuration, as is the case with the first aspect, a system for causing an autonomous robot to do a work requested by a user can be implemented at a low cost, without using an additional dedicated sub-system that allows the user to make a work request to the robot.

Embodiments of the present invention will be described below with reference to the drawings.

FIG. 1 is a diagram showing an overall configuration of an autonomous robot system according to an embodiment of the present invention.

This autonomous robot system is configured to control an autonomous robot such that, in response to a work request from a user, the autonomous robot does a work requested by the user. The system includes a worker robot(s) 1 (autonomous robot), a robot control server 2 (control device), a user terminal(s) 3, a smart speaker(s) 4 (voice input terminal), a cloud server 5, a camera(s) 6, a presence management server 7 (stay management server), and a face authentication server 8. The worker robot 1, the robot control server 2, the user terminal 3, the smart speaker 4, the cloud server 5, the camera 6, the presence management server 7, and the face authentication server 8 are connected to each other via a network.

The worker robot 1 is configured to be capable of traveling autonomously. In response to instructions from the robot control server 2, the worker robot 1 does a work requested by a user in a facility.

The worker robot 1 is equipped with a camera 11. The camera 11 captures images of persons staying in the facility, especially those seated in an office(s) of the facility. Images captured by the camera 11 are used by the face authentication server 8; that is, a face authentication system is constituted by the camera 11 together with the face authentication server 8.

The robot control server 2 controls operations of the worker robot 1. The robot control server 2 receives a work request provided from a user, the work request being input by the user through the user terminal 3 or the smart speaker 4, and instructs the worker robot 1 to perform operations for the requested work.

A user terminal 3 is operated by a person in the facility, in particular, a person (user) present in an office in the facility. A user terminal 3 comprises a personal computer (PC), a tablet terminal, or any other suitable device. A user can operate on a user terminal 3 to request a work to be done by the worker robot 1. A user can make a work request to a worker robot 1 through a user terminal 3 by using a chat service provided by the cloud server 5.

A smart speaker 4 provides audio output provided from the cloud server 5 and other devices. The smart speaker 4 also can capture a user's speech and convert the speech into text information using speech recognition; that is, the smart speaker 4 can function as a voice input device. A user can make a work request to a worker robot 1 through a smart speaker 4 by using the voice input/output service provided by the cloud server 5.

The cloud server 5 provides SNS services. A user can use the SNS services by using a user terminal 3 or a smart speaker 4. Some SNS software applications are installed on a user terminal 3 or a smart speaker 4. An SNS system is constituted by the cloud server 5 together with the user terminals 3 or the smart speakers 4. Specifically, the cloud server 5 controls the chat services that can be used by using the user terminals 3. The cloud server 5 controls voice input/output services that can be used by using the smart speakers 4. The cloud server 5 also controls web services that can be used by using the user terminals 3.

Each of the cameras 6 is installed at an appropriate location in the facility (e.g., on the ceiling) and used to capture images of persons in the facility. An image captured by a camera 6 is used by the presence management server 7, and a presence management system is constituted by the cameras 6 together with the presence management server 7. In other embodiments, a worker robot 1 may capture images of persons in the facility so that a captured image is used to perform face authentication, and that a face authentication result can be used by the presence management server 7.

The presence management server 7 manages presence states of persons in the office based on images captured by the cameras 6. The presence management server 7 also serves as a delivery server that delivers presence information on the presence states of persons in the office to the user terminals 3, which allows other users to check at which a user is seated and/or whether a user is currently present or not.

The face authentication server 8 performs face authentication (face verification) using images captured by the camera 11 of a worker robot 1 to thereby identify a person seated in the office.

In the present embodiment, the system is configured to include the robot control server 2 as a control device for controlling worker robots 1. However, in other embodiments, the system may be configured such that each worker robot 1 is equipped with a control device to control the robot itself; that is, a worker robot 1 has the function of the robot control server 2.

In the present embodiment, the system is configured such that the presence management server 7 manages a person's presence in an office, which configuration is not meant to be limiting. In other embodiments, the system may be configured such that a stay management server is used to manage the stay state of each person in a facility, especially the location of each user staying in the facility.

Figure 2:
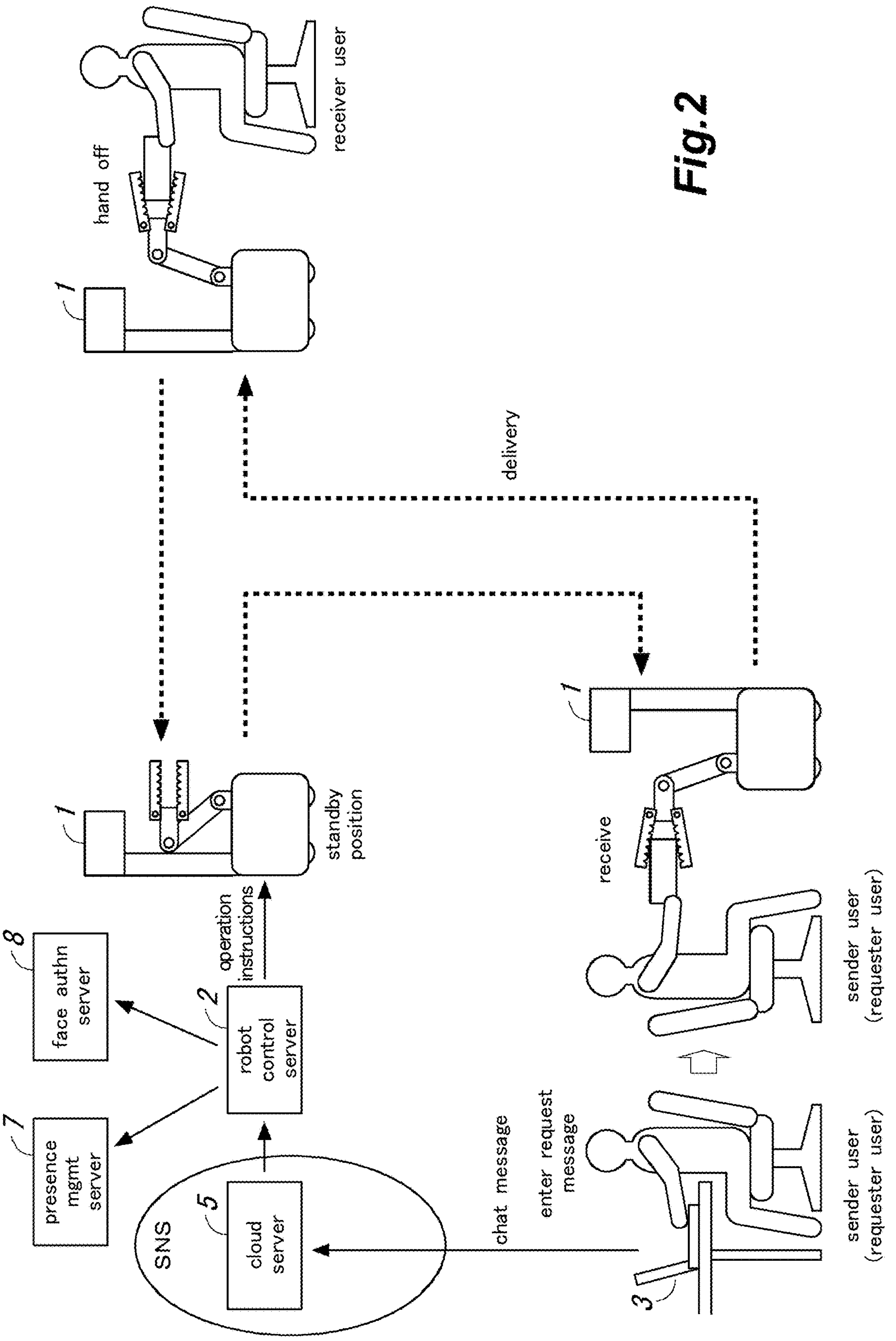
FIG. 2 is an explanatory diagram showing an outline of operations performed by a worker robot when a requested work to be done by the worker robot is delivery of an item.

Next, use of the system when a requested work to be done by a worker robot 1 is delivery of an item will be described. FIG. 2 is an explanatory diagram showing an outline of operations performed by a worker robot 1 when a requested work to be done by the worker robot 1 is delivery of an item.

First, a user makes a request for item delivery to the robot control server 2. In the present embodiment, such a work request to the robot control server 2 is made via an SNS. More specifically, a work request is made to the robot control server 2 using a user terminal 3 and the chat service provided by cloud server 5.

The user enters a chat message on the chat service screen displayed on the user terminal 3, requesting the work of item delivery. The entered chat message is provided to the robot control server 2 via the cloud server 5.

When receiving the request for item delivery from the user in the form of chat message, the robot control server 2 instructs the worker robot 1 to perform necessary operations for item delivery. The worker robot 1 then starts the work of item delivery.

In this case, the worker robot 1 first moves from a standby place to the position of a sender user (requester user). Then, the worker robot 1 receives an item from the sender user. Next, the worker robot 1 carrying the item moves to the position of a receiver user (a person to whom the item is delivered) and hands off the item to the receiver user. In this way, the work of item delivery is completed and the worker robot 1 returns to the standby position.

When the requested item delivery operation is completed, a report of the completion of item delivery (item delivery completion report) is transmitted from the robot control server 2 to the user terminal 3 via the SNS. The completion report is also made by using the chat services.

In the absence of a receiver user, the worker robot returns to the sender user's position and returns the item to the sender user. In order to eliminate the need to return an item to a sender user, the user may set an unattended delivery option so as to enable receiving the time when a receiver user is absent. For example, a user can register a drop-off location in a facility such as a desk of the user, a shared receiving box, or any other designated place, with the linkage to the user's SNS account or any other ID registered account. Preferably, when a delivery is made by unattended delivery, a worker robot 1 shoots a drop-off place with the camera 11.

When receiving each work request from a user, the robot control server 2 registers the work request in the requested work list one by one in order, and handles a work in the requested work list in the order of registration.

In the present embodiment, a user can enter chat messages in natural language on a user terminal 3. The robot control server 2 analyzes the entered chat message in natural language (natural language analysis operation) to acquire information on the work requested by the user (work information), the information indicating the requested work of delivery of an item and the name of a receiver user.

In the present embodiment, when a worker robot receives an item from a sender user (i.e., requester user), the system performs face authentication to verify the sender user's identity. Similarly, when the worker robot hands off an item to a receiver user, the system performs face authentication to verify the receiver user's identity.

For face authentication, a worker robot 1 shoots the face of each subject (sender or receiver user). Then, the robot control server 2 extracts the subject's face image from the captured image and transmits the subject's face image and a request for face authentication to the face authentication server 8.

In the present embodiment, a sender user and a receiver user stay in a free-address office. In a free-address office, each user can freely select the user's office seat, resulting in that the user's presence state changes from time to time.

To address this condition, the presence management server 7 generates presence information on which office seat each user has taken based on the images captured by the cameras 6, thereby managing the presence state of each user. The robot control server 2 can transmit a message of inquiry about the respective presence states of the sender user and the receiver user, to the presence management server 7, thereby checking the positions where the sender user and the receiver user are seated.

In the present embodiment, the system is applied to free-address offices. However, in the case of a fixed-seat office, the system may also use presence information on the presence state of each user managed by the presence management server 7. For example, when receiving a notification that a receiving user is absent from the presence management server 7, the system may reject a work request for delivery of an item to the receiver user.

Figure 3:
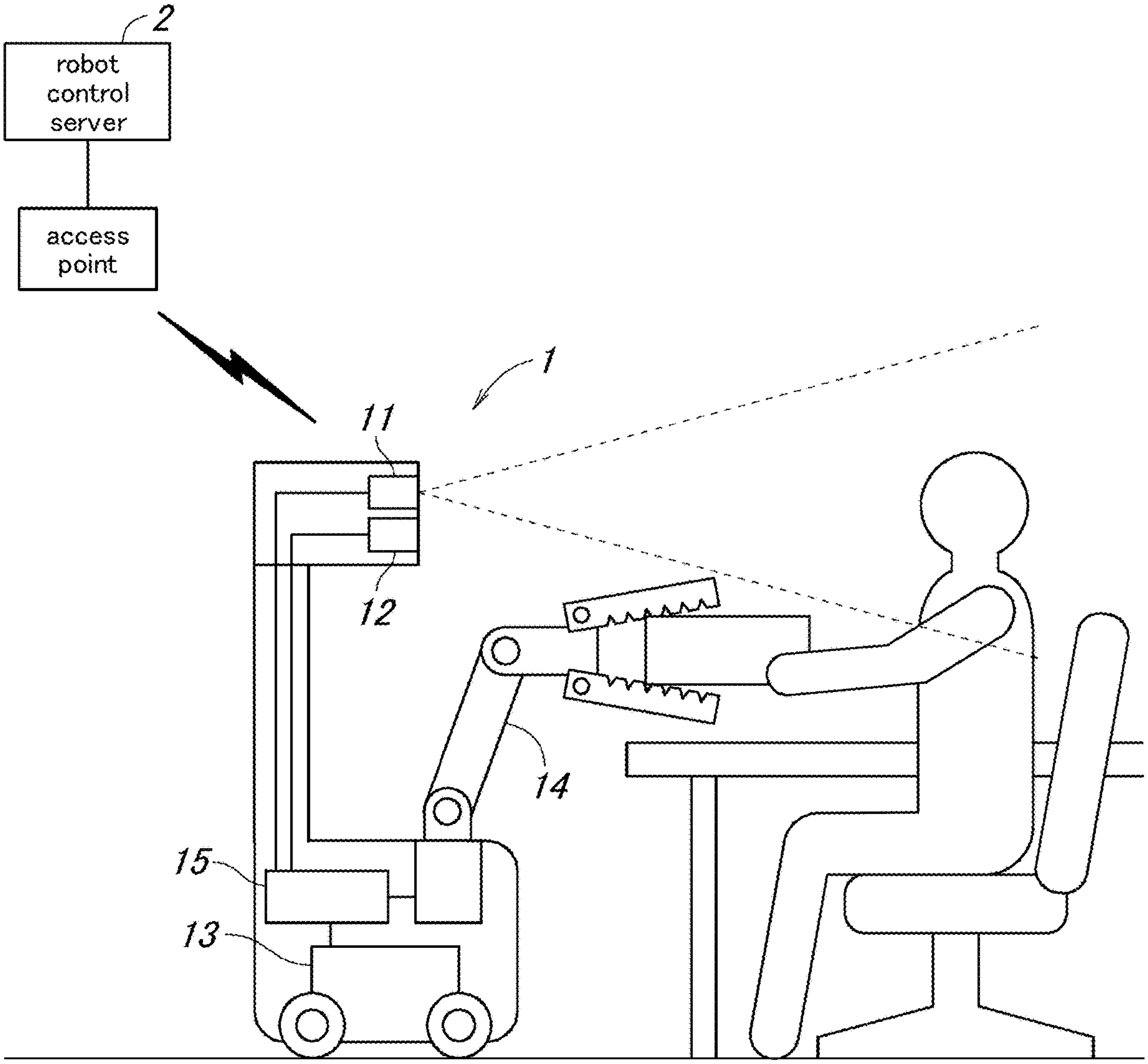
FIG. 3 is an explanatory diagram showing a schematic configuration of a worker robot.

Next, a schematic configuration of a worker robot 1 will be described. FIG. 3 is an explanatory diagram showing a schematic configuration of a worker robot 1.

The worker robot 1 is provided with a camera 11, a speaker 12, a travel device 13, a manipulator 14, and a controller 15.

The camera 11 shoots a user's face according to the control of the controller 15. The system can extract a face image for face authentication from an image captured by the camera 11.

The speaker 12 provides audio outputs for various voice assistances and notifications according to the control of the controller 15.

The travel device 13 includes wheels, motors and other components. The travel device 13 performs autonomous traveling to a destination according to the control of the controller 15.

The manipulator 14 grasps an object (e.g., parcel or item), and can receive and hand over an object from and to a user according to the control of the controller 15.

The controller 15 controls each part of a worker robot 1 based on operation instructions provided from the robot control server 2.

In the present embodiment, the worker robot 1 provided with the manipulator 14 is described above, but this configuration is not meant to be limiting. For example, the worker robot 1 may be provided only with a basket for storing items without any manipulator.

Figure 4:
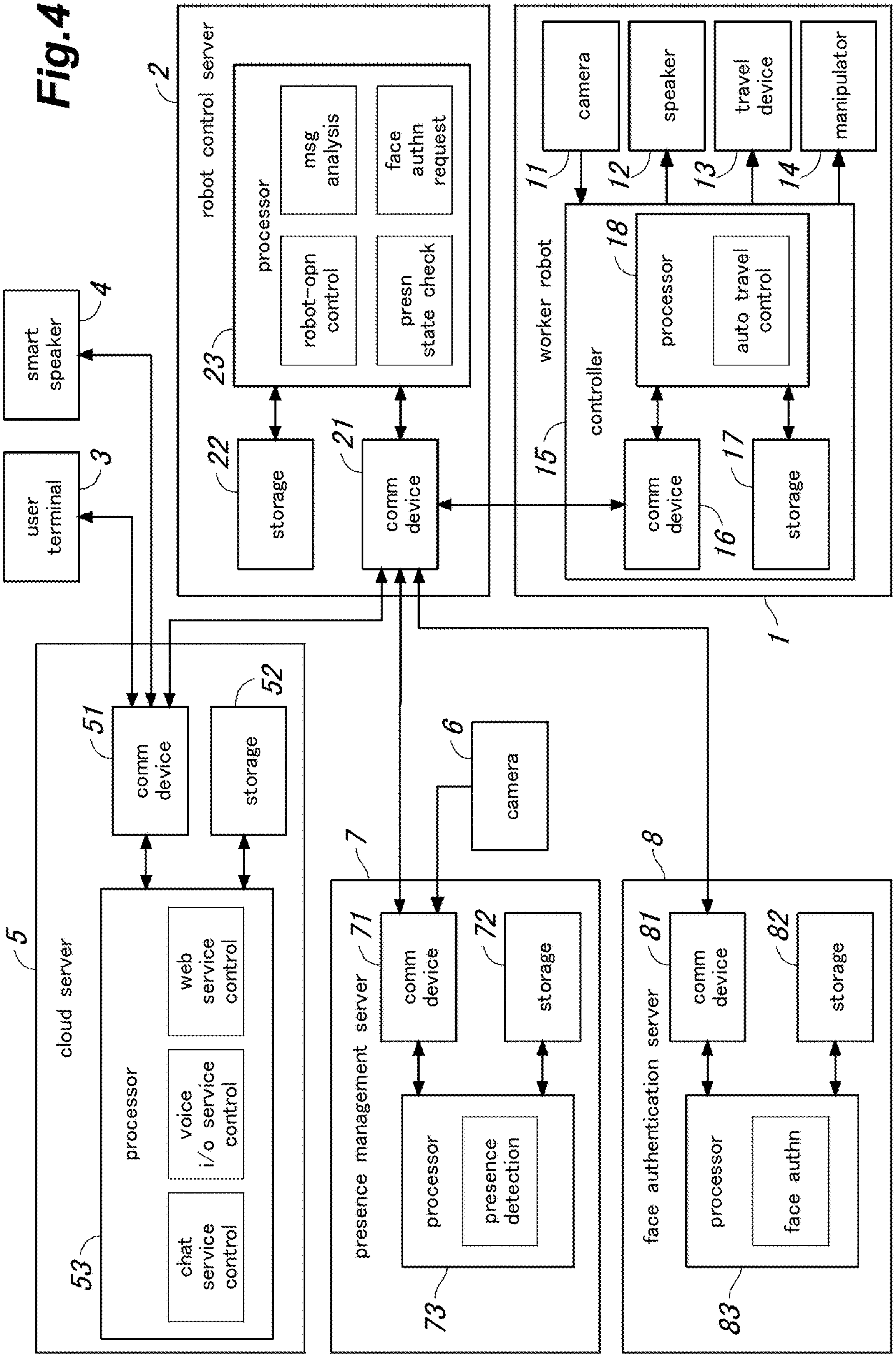
FIG. 4 is a block diagram showing schematic configurations of a worker robot, a robot control server, a cloud server, a presence management server, and a face authentication server.

Next, schematic configurations of a worker robot 1, a robot control server 2, a cloud server 5, a presence management server 7, and a face authentication server 8 will be described. FIG. 4 is a block diagram showing schematic configurations of a worker robot 1, the robot control server 2, the cloud server 5, the presence management server 7, and the face authentication server 8.

The worker robot 1 is provided with a camera 11, a speaker 12, a travel device 13, a manipulator 14, and a controller 15, as described above. The controller 15 includes a communication device 16, a storage 17, and a processor 18.

The communication device 16 communicates with the robot control server 2.

The storage 17 stores programs that can be executed by the processor 18 and other information.

The processor 18 performs various operations by executing programs stored in the storage 17. In the present embodiment, the processor 18 performs an autonomous travel control operation and other operations.

In the autonomous travel control operation, the processor 18 controls the travel device 13 so that the worker robot moves toward a destination indicated by the robot control server 2, while avoiding obstacles based on images captured by the camera 11 and detection results of a distance sensor (not shown) of the worker robot.

The processor also performs other control operations as follows. The processor 18 causes the camera 11 to shoot of a user's face. The processor 18 also causes the speaker 12 to provide audio outputs for various voice assistances and notifications. The processor 18 also causes the manipulator 14 to perform the operations such that the worker robot receives and hands over an object from and to a user.

The robot control server 2 includes a communication device 21, a storage 22, and a processor 23.

The communication device 21 communicates with the worker robot 1, the cloud server 5, the presence management server 7, and the face authentication server 8.

The storage 22 stores programs to be executed by the processor 23 and other information.

The processor 23 performs various operations by executing programs stored in the storage 22. In the present embodiment, the processor 23 performs a robot-operation control operation, a message analysis operation, a presence state check operation, a face authentication operation and other operations.

In the robot-operation control operation, the processor 23 controls the operations of a worker robot 1. Specifically, the processor generates and transmits to the worker robot 1 operation instruction information indicating an operation to be executed by the worker robot 1 and information records or data necessary for the operation. For example, the processor 23 instructs the worker robot 1 to move to a destination, capture images for face authentication, and receive and hand over an object (such as a parcel) from and to a user. When instructing the worker robot 1 to move to the destination, the processor 23 provides the worker robot 1 with the position data of the destination.

In the message analysis operation, the processor 23 analyzes a work request message (text information) in natural language entered by a requester user (natural language processing) to acquire information about a requested work.

In the message analysis operation, a language model constructed by machine learning technology such as deep learning may be used. When a request is made for delivery of an item, the processor 23 analyzes a work request message to acquire the requested work of item delivery and the name of a receiver user.

In the presence state check operation, the processor 23 transmits a message of inquiry about the presence state of a subject (sender user or receiver user) to the presence management server 7. Specifically, the processor 23 transmits a presence state inquiry including the subject's ID information (such as name and user ID) to the presence management server 7, and receives a reply to the inquiry transmitted from the presence management server 7. When the subject is present, the reply to the inquiry includes the subject's position data.

In the face authentication operation, the processor 23 requests the face authentication server 8 to perform face authentication of a subject to verify the identity of the subject (sender user or receiver user). Specifically, the processor 23 extracts the subject's face image from the captured image provided from the worker robot 1, and transmits a request for face authentication including the subject's face image and the subject's ID information (such as name and user ID) to the face authentication server 8. The processor 23 then determines whether or not the subject's face is verified based on the face authentication reply received from the face authentication server 8.

The cloud server 5 includes a communication device 51, a storage 52, and a processor 53.

The communication device 51 communicates with the robot control server 2, the user terminal 3, and the smart speaker 4.

The storage 52 stores programs that can be executed by the processor 53 and other information.

The processor 53 performs various operations by executing programs stored in the storage 52. In the present embodiment, the processor 23 performs a chat service control operation, a voice input/output service control operation, and a web service control operation.

In the chat service control operation, the processor 53 controls the chat services that can be used by using the user terminal 3. In the voice input/output service control operation, the processor 53 controls the voice input/output services that can be used by using the smart speakers 4. In the web service control operation, the processor 53 controls the web services that can be used by using the user terminals 3.

The presence management server 7 includes a communication device 71, a storage 72, and a processor 73.

The communication device 71 communicates with the robot control server 2 and the cameras 6.

The storage 72 stores programs that can be executed by the processor 73 and other information.

The processor 73 performs various operations by executing programs stored in the storage 72. In the present embodiment, the processor 23 performs a presence detection operation.

In the presence detection operation, the processor 73 detects a person in an image captured by the camera 6 to determine whether a person is present at each seat. In the presence detection operation, the processor 73 may use a face authentication result based on the face image of a user captured by the camera 11 of the worker robot 1 to identify the user in the seat.

The face authentication server 8 includes a communication device 81, a storage 82, and a processor 83.

The communication device 81 communicates with the robot control server 2.

The storage 82 stores programs that can be executed by the processor 83 and other information.

The processor 83 performs various operations by executing programs stored in the storage 82. In the present embodiment, the processor 83 performs a face authentication operation.

In the face authentication operation, in response to a request for face authentication from the robot control server 2, the processor 83 extracts face feature data of a subject from the subject's face image provided from the robot control server 2, and compares the subject's face feature data with face feature data of each registered person for matching to thereby identify the subject.

Figure 5:
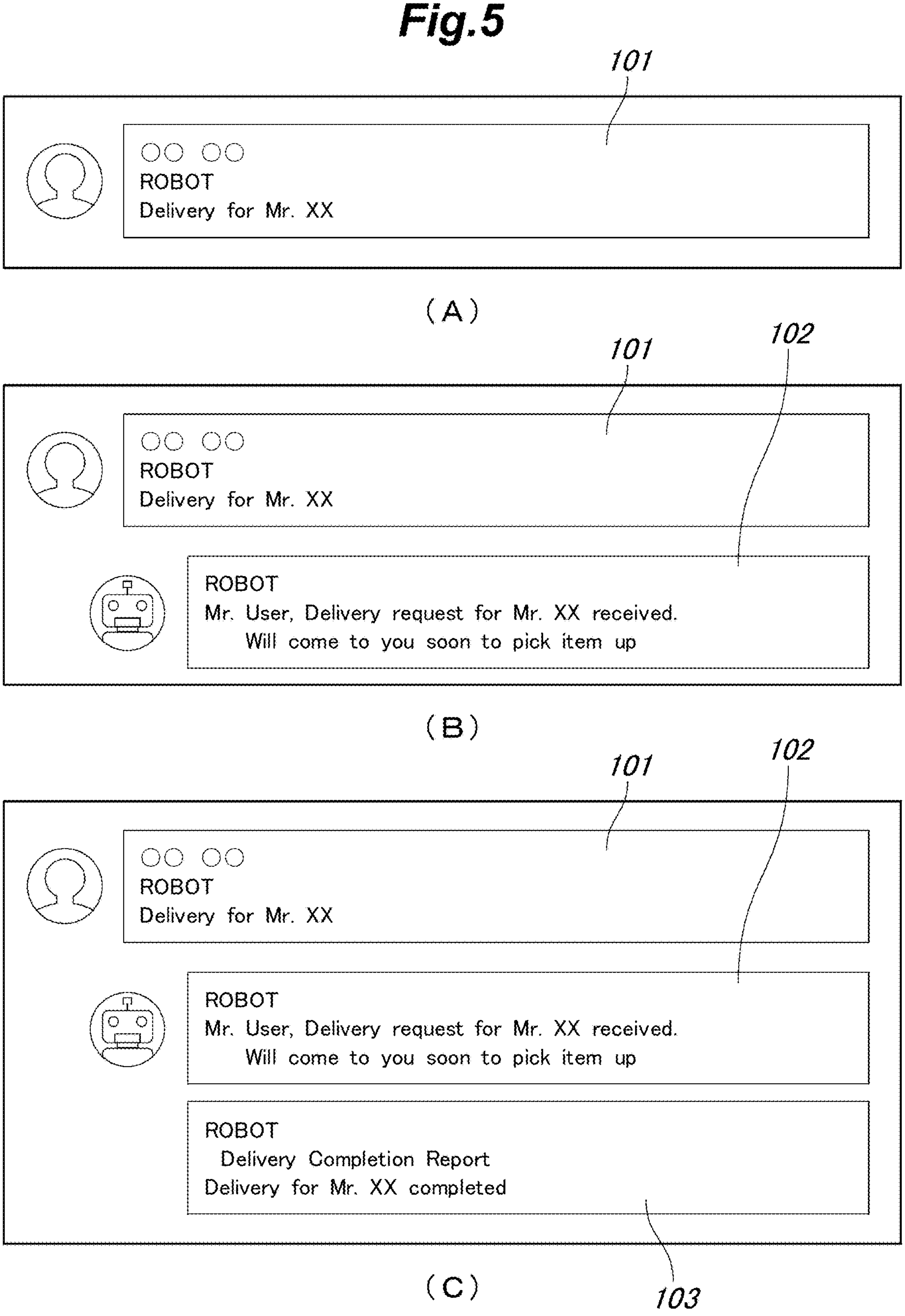
FIG. 5 is an explanatory diagram showing a chat service screen displayed on a user terminal.

Next, an outline of a request for item delivery by using a chat service will be described. FIG. 5 is an explanatory diagram showing a chat service screen displayed on a user terminal 3.

A user operates the user terminal 3 so that the user terminal 3 displays the chat service screen of the SNS application, and then the user uses a keyboard or any other input device to enter a work request to the worker robot 1 on the screen.

As shown in FIG. 5(A), the user designates a selected worker robot 1 in a message entry field 101 on the chat service screen to notify a chat partner of the worker robot, and then the user enters a work request and a designated type of work in natural language.

In response to the user's operation on the chat service screen, the user terminal 3 transmits work request information to the cloud server 5, where the work request information includes destination information indicating that the chat partner is a worker robot 1, a chat message (text information) including the work request and the type of work, and user information pre-registered in the user terminal 3 (requester user information).

Upon receiving the work request information including the destination information, the chat message, and the user information from the user terminal 3, the cloud server 5 forwards the chat message and the requester user information to the robot control server 2 based on the destination information.

Upon receiving the chat message and the requester user information from the cloud server 5, the robot control server 2 performs message analysis (natural language processing) on the natural language chat message to acquire information about the work requested by the user. In this example, as the requested work is delivery of an item, the robot control server 2 acquires the type of the work that is delivery of an item and the name of a receiver user. In this way, the robot control server 2 can accept the work request for item delivery.

When successfully accepting the work request for item delivery, the robot control server 2 transmits a chat message in reply to the chat message from the requester user. As a result, as shown in FIG. 5(B), a reply message indicator 102 in the chat service screen displayed on the user terminal 3 indicates the chat message from the worker robot 1 notifying that the request has been accepted.

When the item delivery is successfully completed, as shown in FIG. 5(C), a reply message indicator 103 in the chat service screen indicates a message reporting the completion of the delivery transmitted from the worker robot 1. In this way, a requester user can easily recognize that the requested work of item delivery has been successfully completed.

Next, information on robot-operation instructions provided to a worker robot when a requested work is delivery of an item will be described. FIG. 6 is an explanatory diagram showing operation instruction information.

The robot control server 2 transmits operation instruction information to a worker robot 1 so that the worker robot 1 executes the work of item delivery. This operation instruction information includes information indicating operations for the item delivery and detailed information on each operation. Based on the operation instruction information received from the robot control server 2, the worker robot 1 performs each operation for the work of item delivery.

The operation instruction information instructs the worker robot to perform the following robot operations. The first robot operation is moving to a destination position (a sender user's position) where the robot receives an object (item or parcel) to be delivered. The information on this movement operation is provided together with position data (such as seat ID) of the sender user (position of the destination) as detailed information. The next robot operation is shooting the face of the sender user for face authentication to verify the user's identity. The next robot operation is receiving the object (item or parcel). The next robot operation is moving to the destination (the position of the receiver user) where the object (item) is to be delivered. The information on this movement operation is provided together with the position data (such as seat ID) of the receiver user. The next robot operation is shooting the face of the receiver user to verify the identity of the receiver user at the delivery destination. The next robot operation is handing off the object (item) to the receiver user.

In this process, the robot control server 2 transmits a message of inquiry about the presence state, along with the sender user's ID information, to the presence management server 7 to acquire the sender user's position data (such as seat ID). The robot control server 2 transmits an inquiry about the presence state of the receiver user, along with the receiver user's ID information, to the presence management server 7 to thereby acquire the receiver user's position data (such as seat ID).

The robot control server 2 instructs the worker robot 1 to capture a face image of the sender user for face authentication to verify the sender user's identity. Upon acquiring the face image of the sender user from the worker robot 1, the robot control server 2 transmits a request for face authentication to the face authentication server 8. The request for face authentication is provided together with the sender user's face image and ID information (such as name). Also, the robot control server 2 instructs the worker robot 1 to capture a face image of the receiver user for face authentication to verify the receiver user's identity. Upon acquiring the face image of the receiver user from the worker robot 1, the robot control server 2 transmits a request for face authentication to the face authentication server 8. The request for face authentication is provided together with the receiver user's face image and ID information (such as name).

Figure 7:
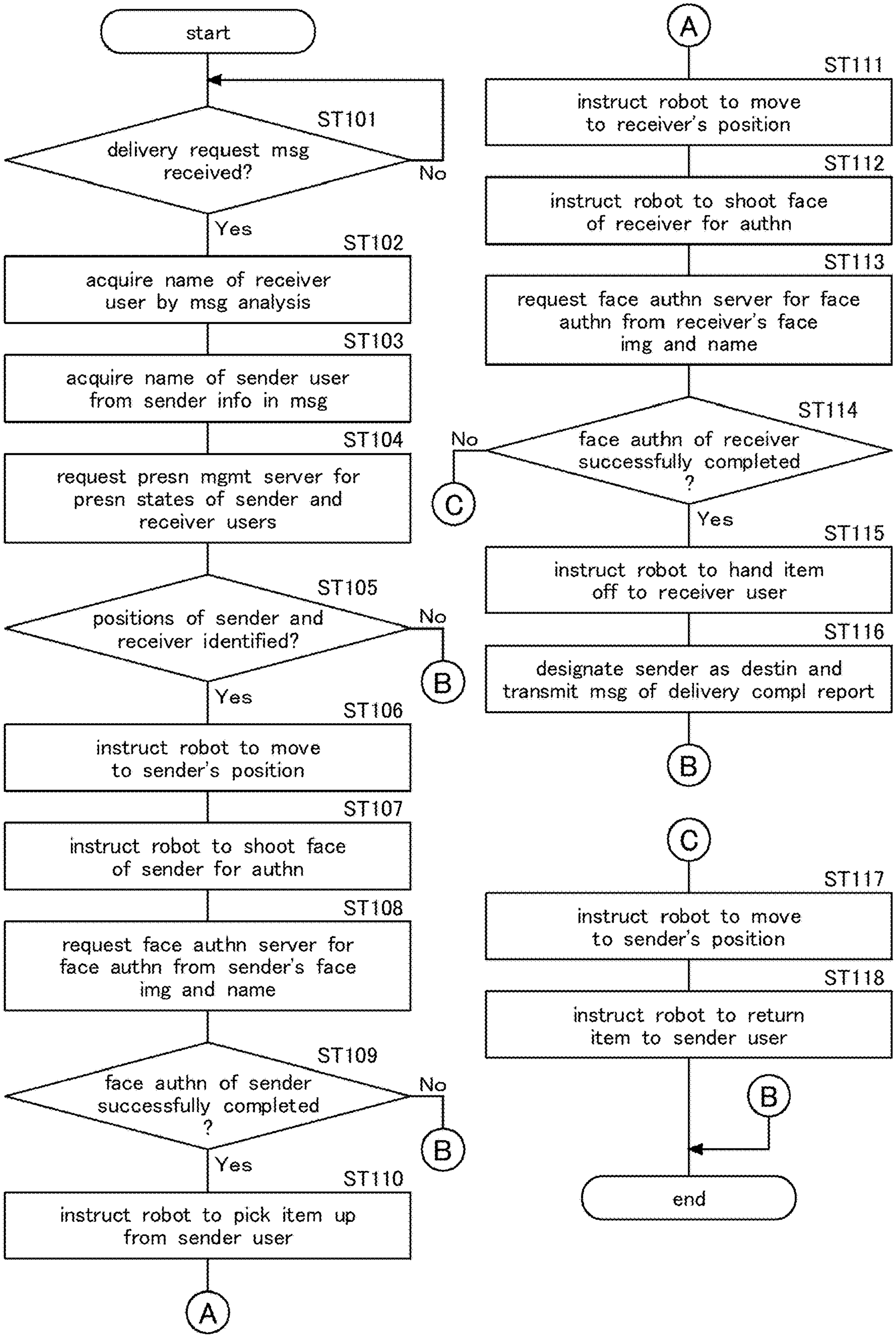
FIG. 7 is a flow chart showing an operation procedure of operations performed by a robot control server.

Next, an operation procedure of operations performed by the robot control server 2 will be described. FIG. 7 is a flow chart showing an operation procedure of operations performed by the robot control server 2.

When receiving a chat message requesting item delivery from a user terminal 3 operated by a sender user (requester user) via the cloud server 5 (Yes in ST101), the robot control server 2 performs message analysis (natural language processing) on the chat message to acquire the type of requested work that is delivery of an item and the ID data (such as name or user ID) of a receiver user (ST102). The robot control server 2 acquires the sender user's ID data (such as name or user ID) from the sender's user information added to the chat message (ST103).

Next, the robot control server 2 transmits a message of inquiry about the presence states of the sender user and the receiver user to the presence management server 7 (ST104).

In this process step, the robot control server 2 transmits a presence state inquiry message, the message including ID data of the sender user and the receiver user, to the presence management server 7, and receives a reply to the inquiry message from the presence management server 7. When the sender user and the receiver user are present, the reply includes the position data of the sender user and that of the receiver user.

Next, the robot control server 2 determines whether or not the positions of the sender user and the receiver user have been identified (ST105).

When having failed to identify the positions of the sender user and the receiver user (No in ST105), the robot control server 2 stops the operation process.

When having identified the position of the sender user and that of the receiver user (Yes in ST105), then the robot control server 2 instructs the worker robot 1 to move to the destination position where the robot receives the item to be delivered (the sender user's position) (ST106). In this process step, the worker robot 1 controls the travel (movement) of the robot itself based on the position data of the destination provided from the robot control server 2 and map information prestored in the worker robot 1.

Next, the robot control server 2 instructs the worker robot 1 to shoot the face of the sender user for face authentication to verify the sender user's identity (ST107). Then, the worker robot 1 uses the camera 11 to shoot the face of the subject (the sender user) and transmits the captured image to the robot control server 2.

Next, the robot control server 2 extracts a face image of the subject from the captured image provided from the worker robot 1 and transmits a request for face authentication, the request including the subject's face image and the sender's user ID data (such as name or user ID), to the face authentication server 8 (ST108).

The face authentication server 8 then extracts face feature data from the subject's face image while acquiring the face feature data of the sender user based on the sender user's ID data, and then compares face feature data of the subject with that of the sender user for matching. Next, the face authentication server 8 transmits a face authentication reply including a face authentication result to the robot control server 2.

Next, the robot control server 2 determines whether or not face authentication is successfully completed; that is, the sender user's identity is verified based on the face authentication reply provided from the face authentication server 8 (ST109).

When the face authentication is unsuccessfully completed; that is, verification of the sender user's identity fails (No in ST109), the robot control server 2 stops the operation process.

When the face authentication is successfully completed; that is, the sender user's identity is verified (Yes in ST109), the robot control server 2 instructs the worker robot 1 to receive the item (ST110). The worker robot 1 moves the manipulator 14 to receive the item from the sender user.

Next, the robot control server 2 instructs the worker robot 1 to move to the destination position where the item is to be delivered (the position of the receiver user) (ST111). In this process step, the operation of the worker robot 1 is the same as that of moving to the position of the sender user's seat.

Next, the robot control server 2 instructs the worker robot 1 to shoot the face of the receiver user for face authentication to verify the receiver user's identity (ST112). In this process step, the operation of the worker robot 1 is the same as that of shooting the face of the sender user for face authentication to verify the sender user's identity.

Next, the robot control server 2 extracts a face image of the subject from the captured image provided from the worker robot 1 and transmits a request for face authentication, the request including the subject's face image and the receiver user's ID data (such as name or user ID), to the face authentication server 8 (ST113). In this process step, the operation of the face authentication server 8 is the same as that of face authentication to verify the sender user's identity.

Next, the robot control server 2 determines whether or not face authentication is successfully completed; that is, the receiver user's identity is verified (ST114).

When the face authentication is successfully completed; that is, the receiver user's identity is verified (Yes in ST114), the robot control server 2 instructs the worker robot 1 to hand off the item to the receiver user (ST115). The worker robot 1 moves the manipulator 14 to hand off the item to the receiver user.

Next, the robot control server 2 transmits a chat message, the message reporting the completion of the delivery and designating the sender user as a message destination, to the cloud server 5 (ST116). The cloud server 5 transmits the chat message to the user terminal 3. The user terminal 3 displays the chat message reporting the completion of delivery on the chat service screen.

When the face authentication is unsuccessfully completed; that is, verification of the receiver user's identity fails, for example, when the receiver user is absent (away from the seat) (No in ST114), the robot control server 2 instructs the worker robot 1 to move to the destination position where the item is to be returned (the position of the sender user) (ST117).

Next, the robot control server 2 instructs the worker robot 1 to return the item to the sender user (ST118). The worker robot 1 moves the manipulator 14 to hand over the item back to the sender user.

Figure 8:
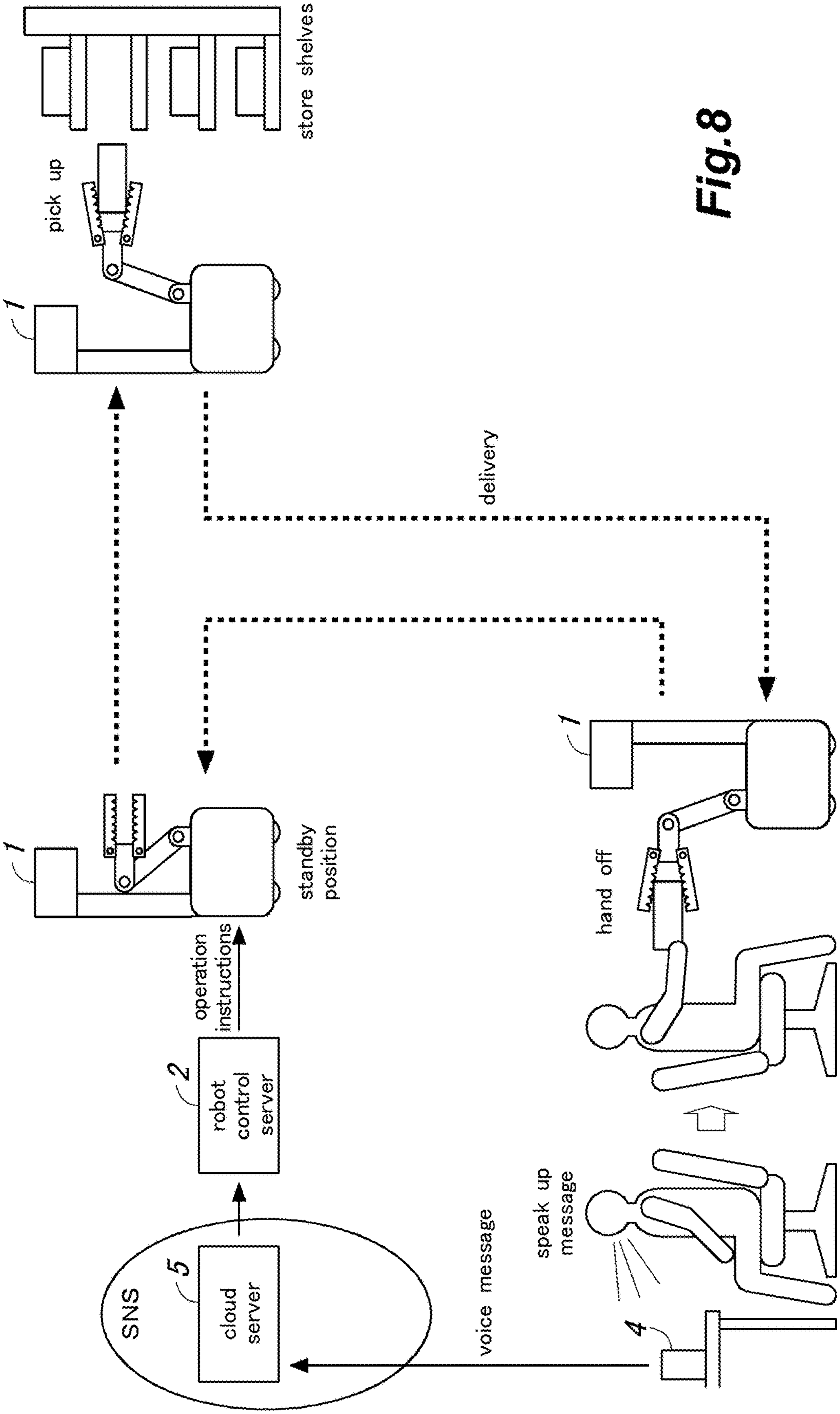
FIG. 8 is an explanatory diagram showing an outline of operations performed by a worker robot when a requested work to be done by the worker robot is delivery of an ordered item.

Next, use of the system when a requested work to be done by a worker robot 1 is delivery of an ordered item will be described. FIG. 8 is an explanatory diagram showing an outline of operations performed by a worker robot 1 when a requested work to be done by the worker robot 1 is delivery of an ordered item.

A user can request the worker robot 1 to deliver an ordered merchandise item at a store in a facility to the user. In this example, the worker robot 1 is requested to pick up an ordered merchandise item from a store's shelf and deliver the item to the user.

Specifically, the user first transmits a work request for order delivery to the robot control server 2. In this process step, the work request to the worker robot 1 is made using the smart speaker 4 and the voice input/output service provided by the cloud server 5.

The user speaks words to the smart speaker 4, requesting the work of order delivery (delivery of an ordered item). The smart speaker 4 captures the user's speech with a microphone, and performs a speech recognition operation on the speech to thereby acquire the voice message (text information) as a result of speech recognition. The speech message is provided to the robot control server 2 via the cloud server 5.

When receiving the request for order delivery from the user in the form of voice message, the robot control server 2 instructs a worker robot 1 to perform necessary operations for order delivery. The worker robot 1 then starts operations for order delivery.

In this case, the worker robot 1 first moves from a standby place to the position of a store (a place where the ordered item can be picked up). At the store, the worker robot 1 picks up the ordered item from the store's shelf. Then, the worker robot 1 delivers the ordered item to the requester user's position. Then, the worker robot 1 hands over the item to the requester user. In this way, the work of order delivery is completed and the worker robot 1 returns to the standby place.

In the present embodiment, a user speaks a work request in natural language. Specifically, the user issues voice commands to designate a selected worker robot 1 and a work requested by the user, to thereby notify a delivery service provider of the selected worker robot and the requested work. In the case of the work of delivery of an ordered item, the user needs to utter words in natural language, the words including the name of a store where an ordered merchandise item is sold and the name of the ordered merchandise item.

The smart speaker 4 transmits voice messages (text information) provided as a speech recognition result to the cloud server 5, together with the user information (requester user's information) pre-registered in the smart speaker 4. In some cases, the speech recognition operation may be performed by the cloud server 5.

Upon receiving the voice messages (text information) and the requester user's information from the smart speaker 4, the cloud server 5 performs a message analysis operation (natural language analysis) on the voice messages to identify a service requested by the user. When determining that the service requested by the user requires use of a worker robot 1, the cloud server 5 transmits the voice messages and the requester user's information to the robot control server 2.

When receiving the voice messages and the requester user's information from the cloud server 5, the robot control server 2 performs a message analysis operation (natural language analysis) on the voice messages to acquire information about the work requested by the user. In the case of the work of delivery of an ordered item, the robot control server 2 acquires ID data of the store where the ordered item is sold (such as store name or store ID), and ID data of the ordered item (such as product name or product ID). The robot control server 2 also acquires a requester user's ID data (name or user ID) from the requester user's information.

The robot control server 2 can acquire store position data from the store ID data from data included in a database in the robot control server 2 to thereby instruct the worker robot 1 to move to the store position. The robot control server 2 can acquire feature data of the appearance of the ordered item from data included in the database therein to thereby instruct the worker robot 1 to pick up the ordered item from a shelf in the store. In some cases, the robot control server 2 can, by using the ID data of the requester user, transmit a message of inquiry about the presence state of the requester user to the presence management server 7 to thereby acquire the position data of the requester user.

When requesting the worker robot 1 to deliver an ordered item, payment for the purchase of an item (payment of the price) needs to be made, and face recognition using the camera 11 of the worker robot 1 may be used for the payment.

In the case of an unmanned store, the worker robot 1 picks up an ordered item from a shelf. In the case of a manned store, a store clerk may hand over the ordered item to the worker robot 1. In the case of the work of order delivery, the worker robot 1 may be required to pick up an object other than merchandise items sold in stores, e.g., a document stored in a remote location.

Next, information on robot-operation instructions provided to a worker robot when a requested work is delivery of an ordered item will be described. FIG. 9 is an explanatory diagram showing operation instruction information.

The robot control server 2 transmits operation instruction information to a worker robot 1 so that the worker robot 1 executes the work of order delivery (delivery of an ordered item). This operation instruction information includes information indicating operations for the order delivery and detailed information on each operation.

The operation instruction information instructs the worker robot to perform the following robot operations. The first robot operation is moving to a destination position (the position of a store) where the robot picks up or receives an object (ordered item). The information on this movement operation is provided together with position data of the store as detailed information. The next robot operations are an object recognition operation to find the necessary object (ordered item) among merchandise items displayed in the store, and an object grasping operation to pick up the found object. The information on these operations is provided together with feature data of the ordered item as detailed information. The next robot operation is moving to the destination (the position of the requester user) where the object (ordered item) is to be delivered. The information on this movement operation is provided together with position data of the requester user (position of the destination) as detailed information. The next robot operation is handing off the object (ordered item) to the requester user.

In this process, the robot control server 2 acquires store position data from the store ID data (store name) from data included in the database in the robot control server 2. The robot control server 2 acquires feature data of an ordered item from the item ID data (such as product name) from data included in the database. The robot control server 2, by using the ID data of the requester user, transmits a message of inquiry about the presence state of the requester user to the presence management server 7 to thereby acquire the position data (such as seat ID) of the requester user.

In the case of order delivery, face authentication may be performed when the worker robot 1 hands off the ordered item to the requester. In this case, the worker robot is prevented from delivering the ordered item to the wrong user.

In the present embodiment, the worker robot 1 performs the object recognition operation for recognizing an ordered item. However, the system may be configured such that the worker robot 1 only shoots the object (item) with the camera 11, and the robot control server 2 performs the object recognition operation based on data in an item database stored in the robot control server 2.

Figure 10:
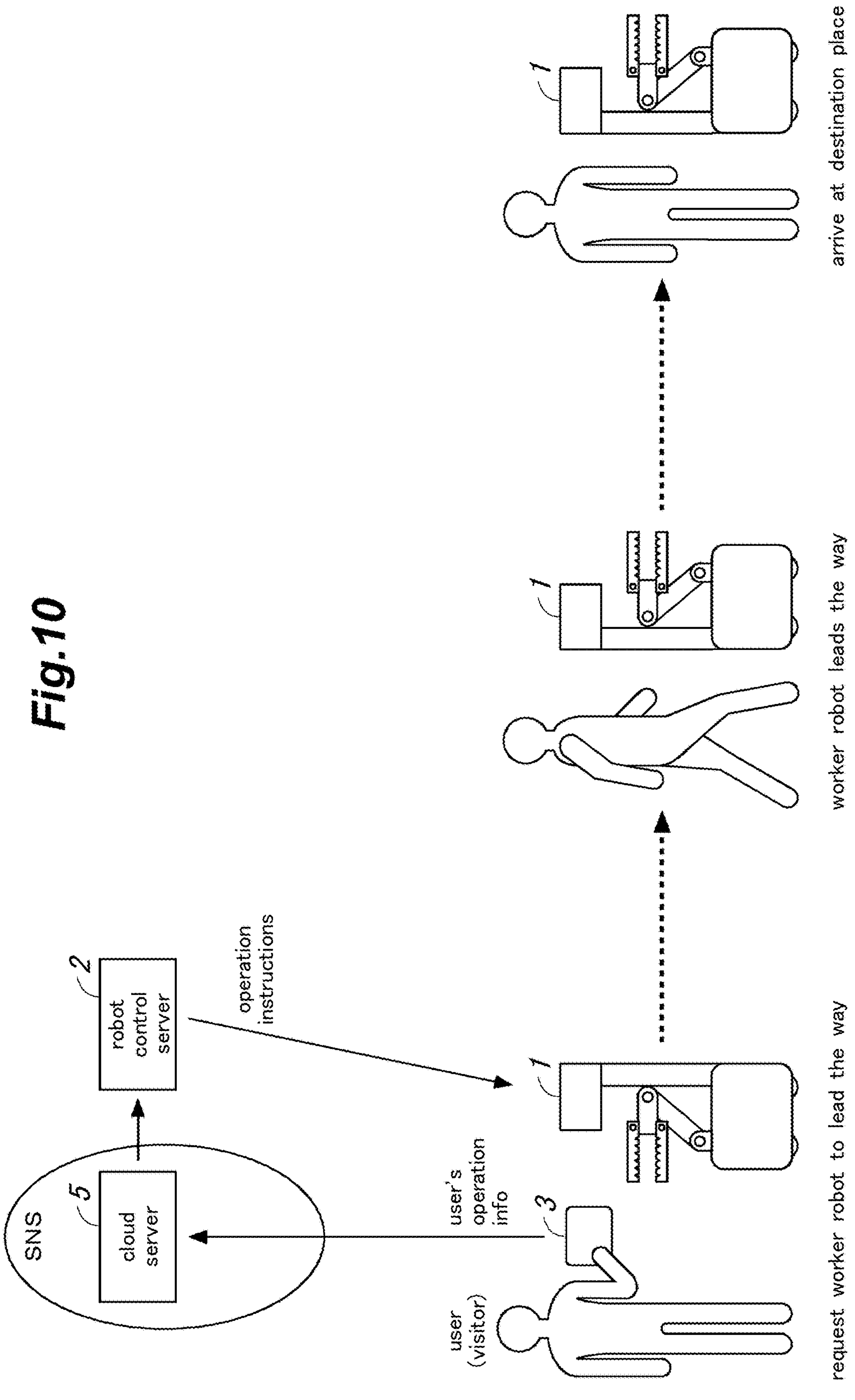
FIG. 10 is an explanatory diagram showing an outline of operations performed by a worker robot when a requested work to be done by the worker robot is leading the user to a destination.

Next, use of the system when a requested work to be done by a worker robot 1 is leading the way will be described. FIG. 10 is an explanatory diagram showing an outline of operations performed by a worker robot 1 when a requested work to be done by the worker robot 1 is leading the user to a destination.

A user can request a worker robot 1 to perform the work of leading the way (lead-the-way service); that is, leading the user to a destination where the user wants to go in a facility. For example, when a user is a visitor, the user usually does not know the locations of conference rooms, offices, or restrooms in the facility. In other cases, in the case of a free-address office, the visitor does not know where a person the visitor wants to meet is seated. In such cases, a worker robot 1 can perform the work of leading the way at the request of the user.

First, a user (e.g., a visitor) requests the robot control server 2 for lead-the-way service, the work of leading the user to a destination. In the present embodiment, a user can use a website to make a work request to a worker robot 1. Such a website to accept users' work requests is built on the cloud server 5. A user can activate a browser on the user terminal 3 to access the website so that a screen (web page) for work request is displayed on the user terminal 3. Then, the user operates the screen displayed on the user terminal 3 to designate a destination where the user wants to go (a place to which the robot is to lead the user) and make a request to a worker robot 1 for leading the way.

The cloud server 5 acquires request information, i.e., information on the user's operation to request for lead-the-way service, from the user terminal 3 and provides the request information to the robot control server 2. Upon receiving the user's request information acquired via the cloud server 5, the robot control server 2 accepts the user's work request for leading the way and instructs the worker robot 1 to perform operations for leading the way. The worker robot 1 then starts the work of leading the user to the destination.

In this process, the worker robot 1 starts traveling toward the destination. In other words, the worker robot 1 leads the user (visitor) to the destination.

Next, information on robot-operation instructions provided to a worker robot when a requested work is leading the user to a destination will be described. FIG. 11 is an explanatory diagram showing operation instruction information.

The robot control server 2 transmits operation instruction information to a worker robot 1 so that the worker robot 1 executes the work of leading a user to a destination.

The operation instruction information instructs the worker robot to perform the robot operation of moving to a destination position (a place to which the robot is to lead the user). The information on this movement operation is provided together with position data of the destination as detailed information.

In this process, the robot control server 2 acquires position data of the destination (a place to which the robot is to lead the user) based on data included in the database in the robot control server 2, generates operation instruction information including the position data of the destination, and transmits the generated information to the worker robot 1.

Figure 12:
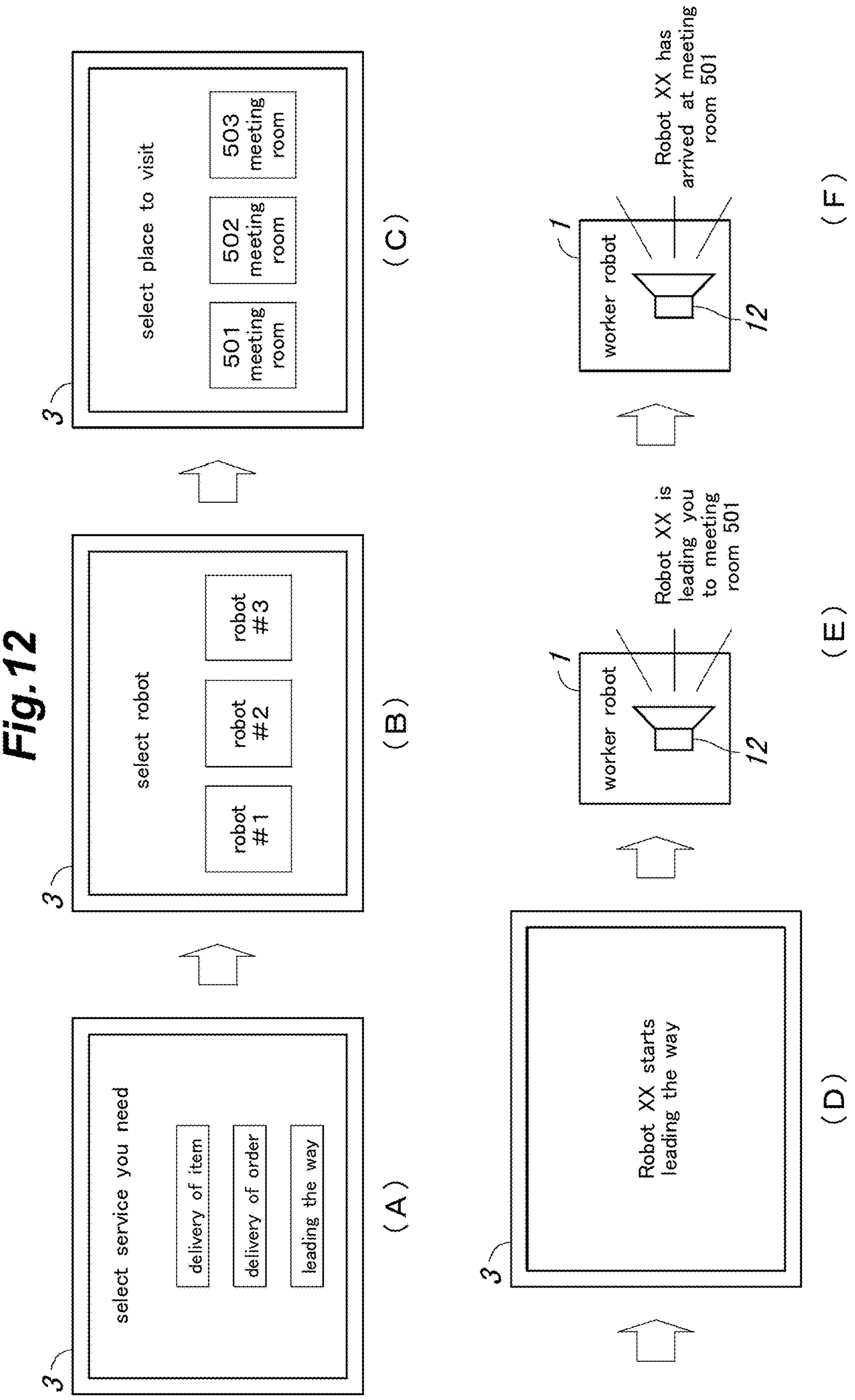
FIG. 12 is an explanatory diagram showing how a user can make a work request to a worker robot by using a user terminal and how the worker robot leads the user to a destination.

Next, use of a website to request a worker robot 1 to lead a user to a destination will be described. FIG. 12 is an explanatory diagram showing how a user can make a work request to a worker robot 1 by using a user terminal 3 and how the worker robot 1 leads the user to a destination.

A user can activate a browser on a user terminal 3 to access the website so that a screen (web page) for work requests is displayed on the user terminal 3.

When a user starts using the website, a menu screen shown in FIG. 12(A) is displayed on the user terminal 3 (tablet terminal). The user can operate the menu screen to select a service which the user wants to request. When the user selects leading the way (lead-the-way service), the screen transitions to a robot selection screen shown in FIG. 12(B). The user can operate the robot selection screen to select a worker robot 1 which the user wants to use. When the user selects a worker robot 1, the screen transitions to a destination selection screen shown in FIG. 12(C). Then, when the user selects a destination, the screen transitions to a lead-the-way start screen shown in FIG. 12(D). Then, the worker robot 1 starts the work of leading the user to the destination.

When the worker robot 1 starts the work of leading the way, the speaker 12 outputs a voice guidance stating that the robot starts leading the way, as shown in FIG. 12(E). When the worker robot 1 arrives at the destination, the speaker 12 outputs a voice guidance stating that the robot has arrived at the destination, as shown in FIG. 12(F).

In response to the user's operation on each screen, the user terminal 3 transmits user operation information, i.e., information on the user's operations thereon, to the cloud server 5.

When receiving the user operation information from the user terminal 3, the cloud server 5 transmits a work request for lead-the-way service to the robot control server 2 based on the user operation information. The work request for lead-the-way service includes ID data of the worker robot 1 that is used in the service and information on the destination to which the robot is required to lead the user.

When receiving the work request for lead-the-way service from the cloud server 5, the robot control server 2 transmits operation instruction information to a worker robot 1 selected by the user. The operation instruction information includes instructions for the worker robot to travel (move) to the destination for lead-the-way service together with position data of the destination as detailed information.

In the case of work request using the website, a user only selects a worker robot. Thus, there is no need for message analysis as in the case of work requests using the chat service or the smart speaker 4.

In the present embodiment, the system is configured such that a work request for item delivery is made using the chat service, that a work request for order delivery is made using the smart speaker 4, and that a work request for lead-the-way service is made using a website, but this configuration is not meant to be limiting. For example, the system may be configured such that the chat service is used to make a work request for order delivery, that the smart speaker 4 is used to make a work request for lead-the-way service, and that a website is used to make a request for item delivery or order delivery.

In the present embodiment, the system is configured such that requestable works to be done by a worker robot 1 include item delivery, order delivery, and lead-the-way service, but this configuration is not meant to be limiting. For example, requested works to be done by a worker robot 1 may include delivery of a document from one person to another so that persons involved can give stamps of approvals on the document in turn.

While specific embodiments of the present invention are described herein for illustrative purposes, the present invention is not limited to those specific embodiments. It will be understood that various changes, substitutions, additions, and omissions may be made to elements of the embodiments without departing from the scope of the invention. In addition, elements and features of the different embodiments may be combined with each other to yield an embodiment of the present invention.

INDUSTRIAL APPLICABILITY

An autonomous robot system and a method for controlling an autonomous robot according to the present invention have an effect of enabling a system for causing an autonomous robot to do a work requested by a user to be implemented at a low cost, without using an additional dedicated sub-system that allows the user to make a work request to the robot, and are useful as an autonomous robot system and a method for controlling an autonomous robot such that, in response to a work request from a user, the autonomous robot does a work requested by the user.

Glossary

1 worker robot (autonomous robot)
2 robot control server (control device)
3 user terminal
4 smart speaker (voice input terminal)
5 cloud servers
6 camera
7 presence management server (stay management server)
8 face authentication server
11 camera
12 speaker
13 travel device
14 controller
15 manipulator
101 message entry field
102 reply message indicator
103 reply message indicator

The invention claimed is:

1. An autonomous robot system for controlling an autonomous robot such that, in response to a work request for delivery of an item, the autonomous robot does the work of delivery, the system comprising:

a presence management server that manages a presence state and a position of each user staying in a facility;

the autonomous robot configured to move in the facility; and a control device for controlling operations of the autonomous robot, wherein the control device is configured to:

receive, via an SNS system, a message of the work request from a requester user who uses the SNS system, and analyze the message to acquire work information about the work request for delivery of the item, the work information including names of the requester user who made the work request and a receiver user who is to receive the item;

inquire the presence management server about respective presence states of the requester user and the receiver user;

when both the requester user and the receiver user are present, acquire position data of the requester and receiver users' positions from the presence management server; and control movement of the autonomous robot in the operations of receiving the item from the requester user and handing over the item to the receiver user based on the work information and the position data of the requester and receiver users' positions.

2. The autonomous robot system as claimed in claim 1, further comprising a face authentication server for performing face authentication to verify the requester and receiver users' identities, wherein the autonomous robot is provided with a camera configured to shoot the requester and receiver users' faces, and wherein the control device is configured to:

provide face images captured by the camera and the requester and receiver users' ID information acquired from the message of the work request to the face authentication server;

cause the face authentication server to perform face authentication; and receive a face authentication result from the face authentication server.

3. The autonomous robot system as claimed in claim 1, wherein, when the autonomous robot successfully completes the work of delivery requested by the requester user, the control device transmits a report of work completion to the requester user via the SNS system.

4. A method for controlling an autonomous robot such that, in response to a work request for delivery of an item, the autonomous robot does the work of delivery, wherein the autonomous robot is configured to move in a facility, and wherein a control device controls operations of the autonomous robot, the method comprising causing the control device to:

receive, via an SNS system, a message of the work request from a requester user who uses the SNS system, and analyze the message to acquire work information about the work for delivery of the item, the work information including names of the requester user who made the work request and a receiver user who is to receive the item;

inquire a presence management server about respective presence states of the requester user and the receiver user, the presence management server managing a presence state and a position of each user staying in the facility;

when both the requester user and the receiver user are present, acquire position data of the requester and receiver users' positions from the presence management server; and control movement of the autonomous robot in the operations of receiving the item from the requester user and handing over the item to the receiver user based on the work information and the position data of the requester and receiver users' positions.

5. The autonomous robot system as claimed in claim 1, wherein when the receiver user is not present based on a notification from the presence management server in response to the inquiry to the presence management server, the control device rejects the work request for delivery of the item to the receiver user.

6. The autonomous robot system as claimed in claim 2, wherein when the face authentication of the receiver user is unsuccessfully completed based on the face authentication result from the face authentication server, the control device instructs the autonomous robot to move to a position where the item is to be returned.

* * * * *